United States Patent
O'Sullivan et al.

(10) Patent No.: US 9,367,521 B2
(45) Date of Patent: Jun. 14, 2016

(54) CONTENT AND CONTEXT BASED HANDLING OF INSTANT MESSAGES

(75) Inventors: Patrick J. O'Sullivan, Dublin (IE); Edith H. Stern, Yorktown Heights, NY (US); Robert C. Weir, Westford, MA (US); Barry E. Willner, Briarcliff Manor, NY (US); Marjorie R. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 2487 days.

(21) Appl. No.: 12/023,027

(22) Filed: Jan. 30, 2008

(65) Prior Publication Data

US 2009/0192970 A1 Jul. 30, 2009

(51) Int. Cl.
G06N 5/00 (2006.01)
G06F 1/00 (2006.01)
G06F 17/21 (2006.01)
H04L 12/58 (2006.01)

(52) U.S. Cl.
CPC ............ *G06F 17/211* (2013.01); *H04L 12/581* (2013.01); *H04L 51/04* (2013.01)

(58) Field of Classification Search
USPC .................................. 706/48; 709/224; 726/1
See application file for complete search history.

(56) References Cited

U.S. PATENT DOCUMENTS

| 7,827,561 B2* | 11/2010 | McKee et al. ................. 719/313 |
| 2004/0201623 A1 | 10/2004 | Hamilton, II et al. |
| 2004/0205161 A1 | 10/2004 | Hamilton, II et al. |
| 2004/0215730 A1 | 10/2004 | Hamilton, II et al. |
| 2005/0132011 A1 | 6/2005 | Muller et al. |
| 2006/0168048 A1 | 7/2006 | Lyle et al. |
| 2006/0227943 A1 | 10/2006 | Yan |
| 2006/0248150 A1 | 11/2006 | Chaar et al. |
| 2007/0156832 A1 | 7/2007 | Daniels-Farrar et al. |
| 2009/0063639 A1* | 3/2009 | Lingafelt et al. .............. 709/206 |
| 2009/0089417 A1* | 4/2009 | Giffin et al. ................... 709/224 |
| 2009/0100497 A1* | 4/2009 | Goldberg et al. ................. 726/1 |

OTHER PUBLICATIONS

Matt Hines, CNET News.com, IM status: More worms on the way, Mar. 23, 2005, pp. 1-3, http://www.zdnetasia.com/news/security/0,39044215,39222828,00.htm.

Carroll Communications Inc., Solutions That Work, 2008, pp. 1-2, http://www.carrollcommunications.com/ipoffice/5donotdisturb.html.

South Central Rural Telephone Company, Do Not Disturb Services, 2006, pp. 1-2, http:www.scrtc.com/donotdisturbservice.html.

(Continued)

*Primary Examiner* — Stanley K Hill
*Assistant Examiner* — Kalpana Bharadwaj
(74) *Attorney, Agent, or Firm* — Stevens & Showalter, LLP

(57) ABSTRACT

Instant message systems are enhanced by establishing at least one handling rule that is evaluated in an instant messaging environment, each established handling rule defining a condition based upon at least one of identified content or identified context, and a corresponding event handling action to be performed within the instant message environment. Upon identifying an instant message conversation within the instant message environment between a user and a correspondent, each handling rule is evaluated and the event handling action of an associated handling rule is performed if it is determined that the condition of handling rule is satisfied. Further, an indication that the corresponding event action was performed is conveyed to a corresponding user.

2 Claims, 7 Drawing Sheets

(56) References Cited

OTHER PUBLICATIONS

Ecma International, Standard ECMA-193, Private Integrated Services Network (PISN)—Specification, Functional Model and Information Flows—Do Not Disturb and Do Not Disturb Override Supplementary Services (DND(O)SD), 2nd edition (Jun. 1997), 1 pg., http://www.ecma/-international.org/flat/publications/Standards/ecma-193.htm.

* cited by examiner

CONTENT AND CONTEXT BASED HANDLING OF INSTANT MESSAGES

BACKGROUND OF THE INVENTION

The present invention relates to systems, computer-implemented methods and computer program products for the implementation of content and/or context based handling of instant messages in an instant message environment.

Instant messaging (IM) is a means of communication wherein individuals can communicate with one another using text-based communication over a network in substantially real-time. For purposes of illustration, in an exemplary instant messaging system, a client program executed on a user's processing device may connect to an instant message server, and may further communicate to the server, the internet protocol (IP) address and/or other relevant contact information for the user. The client program may also communicate to the server, a private list of individuals that the user is interested in communicating with via instant messaging. The instant message server temporarily stores the user's connection information and checks to see if any of the individuals in the user's private list are also currently logged into the instant message server. If individuals associated with the user's private list are also logged into the instant message server, then a message may be sent to the user's client program with the connection information for each such located individual. Likewise, the instant message server may also send the user's contact information to individuals who have included the user in their private list.

The client program can then be used to participate in a chat session, e.g., with one or more selected individuals on the user's private list who have also logged into the instant message system. Because the client program has received the appropriate contact information, it is not required that the instant message server itself be involved in the instant message chat session. During the chat session participants enter messages to each other into a chat session window. When a message drafted by one participant is transmitted, a window typically pops up on the display of the processing device of each recipient which contains a scrolling transcription of the conversation including messages entered by each participant of the chat session. The above process continues until the chat session is terminated by the participants.

BRIEF SUMMARY OF THE INVENTION

According to aspects of the present invention, a method of processing instant message transactions is provided. The method comprises establishing at least one handling rule that is evaluated in an instant messaging environment where each established handling rule defines a condition and a corresponding event handling action. Each condition is based upon at least one of identified content or identified context and the event handling action defines an action to be performed within the instant message environment if the associated condition is satisfied. The method further comprises identifying an instant message conversation within the instant message environment between a user and a correspondent and evaluating at least one handling rule. Still further, the method comprises performing at least one event handling action of an associated handling rule if it is determined that the condition of that handling rule is satisfied and conveying to a corresponding user, an indication that the corresponding event action was performed.

According to further aspects of the present invention, a method of processing instant message transactions is provided. The method comprises logging a first instant message client into an instant message server and obtaining from the instant message server, at least one handling rule that is evaluated in an instant messaging environment where each established handling rule defines a condition based upon at least one of identified content or identified context, and a corresponding event handling action to be performed within the instant message environment. The method further comprises identifying an instant message conversation within the instant message environment between a user and a correspondent and evaluating each handling rule. The method still further comprises performing the event handling action of an associated handling rule if it is determined that the condition of handling rule is satisfied and conveying to a corresponding user, an indication that the corresponding event action was performed.

According to still further aspects of the present invention, a method of processing instant message transactions is provided. The method comprises logging a first instant message client into an instant message server to obtain information regarding instant message users associated with a corresponding private list and obtaining from a locally stored memory, at least one handling rule that is evaluated in an instant messaging environment where each established handling rule defines a condition based upon at least one of identified content or identified context, and a corresponding event handling action to be performed within the instant message environment. The method further comprises identifying an instant message conversation within the instant message environment between a user and a correspondent and evaluating at least one handling rule. The method further comprises performing at least one event handling action of an associated handling rule if it is determined that the condition of handling rule is satisfied and conveying to a corresponding user, an indication that the corresponding event action was performed.

DETAILED DESCRIPTION OF THE INVENTION

According to various aspects of the present invention, methods, computer program products and systems are provided for utilizing context and/or content in order to enhance a user's experience with an instant messaging system. Contextual information may comprise information that is detected, obtained or otherwise derived either internally or externally to a corresponding instant messaging system, which may be related to circumstances such as facts, knowledge, conditions or other information determined to be relevant to an instant message user. For example, contextual information may pertain to a particular event, situation, etc. and may characterize user behavior, user activity, environment, setting, hierarchical prioritizations and/or other factors. Content may comprise information that is detected, obtained or otherwise derived either internally or externally to a corresponding instant messaging system, such as information that is matched to designated key words, phrases, symbols and other indicia.

As will be described in greater detail herein, various aspects of the present invention are directed to obtaining and exploiting context and/or content for use in processing instant message transactions. For example, content and/or context can be used to derive "handling rules" that define event handling actions for managing user preferences, e.g., to perform a defined action such as message filtering, message generation or limiting display screen interruptions. Content and/or context may also be used to define "activation rules" which define a triggering event, after which corresponding handling rules may be evaluated and applied if a corresponding handling rule is satisfied. Thus, certain handling rules may be evaluated regardless of circumstances and other handling rules may require that a corresponding activation rule is first satisfied, i.e. the occurrence of a predetermined triggering event occurs before being evaluated as will be described in greater detail herein.

Figure 1:
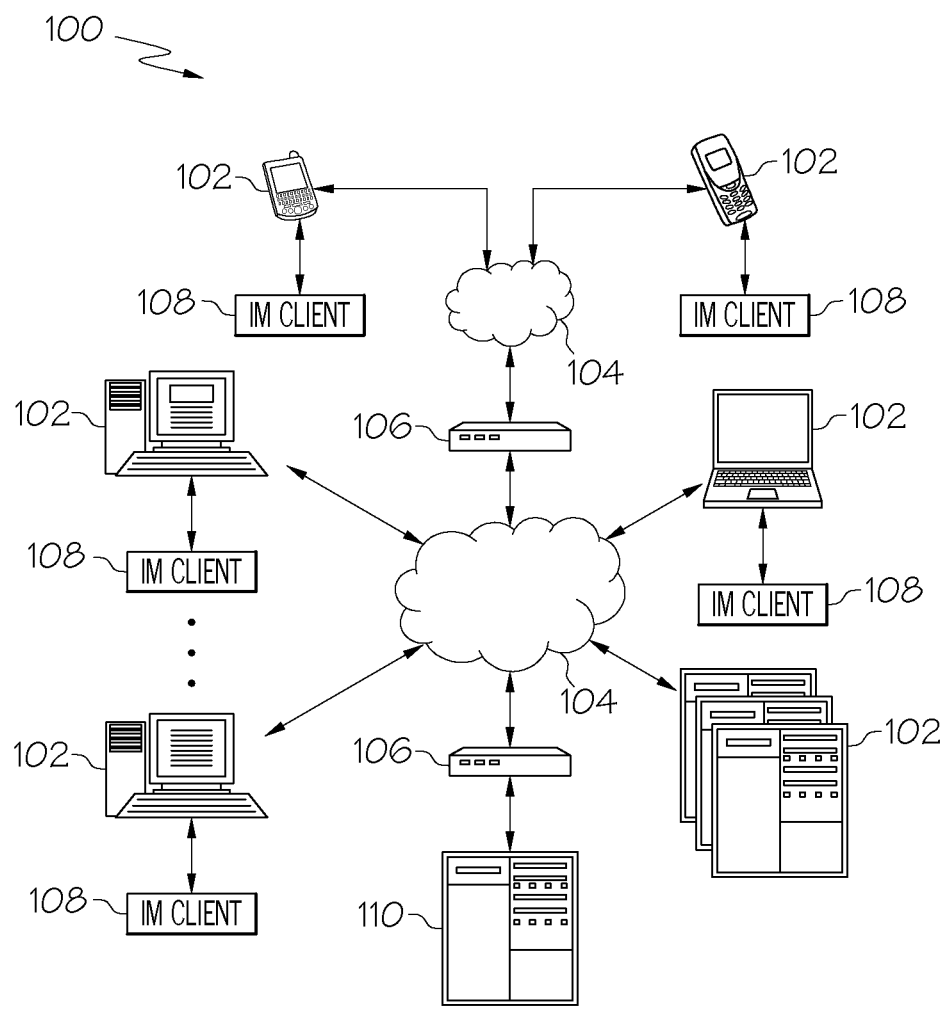
FIG. 1 is a schematic illustration of an exemplary system in which instant messaging can be implemented.

Referring now to the drawings and particularly to FIG. 1, a general diagram of a computer system 100 is illustrated, which may be utilized to enhance instant message environments according to various aspects of the present invention. The computer system 100 comprises a plurality hardware and/or software processing devices, designated generally by the reference 102 that are linked together by a network 104. Typical processing devices 102 may include servers, personal computers, notebook computers, transactional systems, purpose-driven appliances, pervasive computing devices such as a personal data assistant (PDA), palm computers, cellular access processing devices, special purpose computing devices and/or other devices capable of communicating over the network 104. The processing devices 102 may also comprise software, including applications and servers that process information stored in various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces, wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc. The system 100 is shown by way of illustration, and not by way of limitation, as a computing environment in which various aspects of the present invention may be practiced.

As illustrated, the processing devices 102 may participate in a collaborative environment, which may include an instant messaging system. For example, the various processing devices 102 may each execute an instant messaging (IM) client 108 that facilitates instant messaging between processing devices 102 across the network 104. To support instant messaging within the collaborative environment, the illustrated system includes a presence and awareness server 110. The presence and awareness server 110 executes one or more components directed towards instant messaging and may also execute components directed towards other collaborative objectives such as on-line conferencing, paging, person locating and contacting, calendaring etc. Moreover, the presence and awareness server 110 may be implemented across multiple servers through both vertical and horizontal scaling. In general, each user of the collaborative environment supports a "subscription list", "buddy list" or other logical organization that identifies other users within the community whose presence information is to be monitored by that user. The presence and awareness server 110 thus provides publication and/or notification of presence information so that each user receives notifications of presence and optionally, availability changes for the individuals that are identified on their subscription list, e.g., so that user's are updated as to the availability of individuals within the user's subscription list for instant messaging.

Although instant messaging provides a number of conveniences, such as near real-time text based chatting, the conversational courtesies typically used in instant messaging environments does not always align with the demands of busy individuals. To illustrate, assume that a user initiates an instant message conversation with a correspondent also within the collaborative environment to ask a question, such as by opening an instant message window, entering the question into the instant message window and transmitting the message to the correspondent. When the correspondent responds, e.g., with the answer to the original question, the user's instant message client 108 interrupts processing performed on the associated processing device 102 to bring the instant message window into focus as the active program. This action may be acceptable to the user since the user was expecting an answer from the correspondent. The user may then reply to the correspondent by entering a courteous gesture, such as "Thanks" into the instant message window and transmitting the message to the correspondent. This reply serves as both a courtesy and as an acknowledgement of receipt of the communication from the correspondent.

This reply may also be of value to the correspondent. By noting acknowledgment of receipt of the response, the correspondent may, for example, cross off the need to respond to the user's question from a TO-DO list or other organization of required tasks. From the user's perspective, the conversation has been completed, and the user typically moves on to some other activity. However, the user may then be interrupted with a reply message from the correspondent, such as "yw" (your welcome), which causes the instant message window to pop up and gain focus as the active window on the user's processing device, thus interrupting the user from the current activity. The user may further get interrupted yet again with another superfluous message from the correspondent that causes the instant message window to pop up on the user's display, such as a "ttyl" (talk to you later) message. Moreover, when the instant message window pops up and takes focus as the active window, keystrokes being typed by the user, which are intended for other applications, may be inappropriately directed to the instant message pop up window, thus creating further disruption in the work flow of the user.

In the above illustrative example, the automated screen pop ups that apply processing focus to the instant messaging system for such "end of conversation" or gratuitous or superfluous responses may not be desired under all circumstances. Rather, the user may prefer that the instant messaging system convey some other indication of the receipt of a message without actually causing a pop up of the instant message window, such as by logging the message in a chat session transcript to be looked at later, by setting a flag or icon in a system tray to alert the user that a message has been received, to delay the message until the user is not busy or by performing some other activity that provides an indication of the transaction without changing the focus of the user's processing device 102.

As yet another illustrative example, depending upon the specific application, the user may not want to be interrupted by a screen pop up related to an instant message transaction, even during certain active conversations, such as where some other activity of interest takes priority to the user's conversation with the correspondent. As such, according to various aspects of the present invention, context and/or content rules may be utilized to actively, adaptively and/or dynamically enhance the instant messaging environment.

Figure 2:
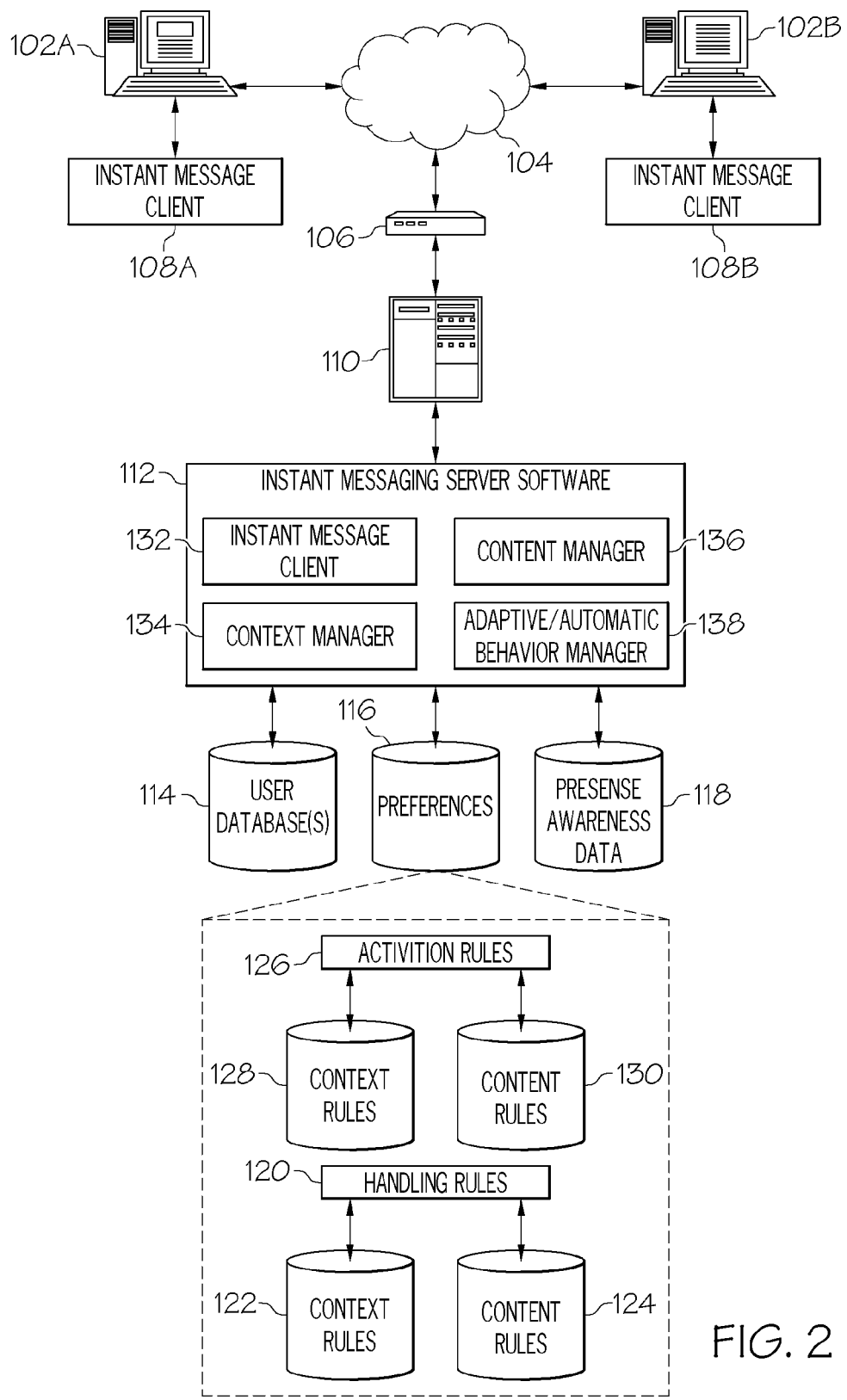
FIG. 2 is a block diagram of a system where a server provides enhanced capabilities directed to content and/or context based handling of instant messages in an instant message environment according to various aspects of the present invention.

Referring to FIG. 2, according to aspects of the present invention, a user on a first processing device, designated 102A may communicate using instant messaging via its instant message client 108A with a correspondent on a second processing device, designated 102B via the corresponding instant message client 108B across a network 104. For example, the instant message clients 108A, 108B may comprise dedicated instant message applications or they may execute within a web browser or other application on the corresponding processing device 108A, 108B respectively. In the illustrated arrangement, the presence and awareness server 110 includes instant message server software 112 having components for facilitating the instant message communications.

The presence and awareness server 110 may allow each user to set an online status or away message so that subscribing peers are notified when the user is available, busy, or away from an associated processing device 102, etc. In this regard, the instant message server software 112 may include a user database 114, which identifies the users participating in the instant message system and their corresponding subscribing peers as well as other user information pertinent to the particular implementation of the instant messaging system. For example, the user database 114 may provide information needed to search for and find other users as well as contact users when they are online, identify their status, etc.

The instant messaging server software 112 may also interact with preference data 116. The preference data may be used to enhance user interaction with the instant messaging environment based upon content and/or context as will be described in greater detail herein. The instant message server software 112 may also be coupled to other optional presence and awareness data, such as may be stored in a presence and awareness database 118.

The preferences stored in the preference database 116 may be characterized in any practical manner. For example, the preferences may be expressed as rules that define how the instant message system responds to predetermined events. For purposes of illustration, the preferences have been conceptually organized to include handling rules 120, which may consist of rules defined by context, such as may be stored in a context data source 122. Also, the handling rules may consist of rules defined by content, which may be stored in a content data source 124. For example, content and/or context based handling rules may be used to define event handling actions for managing user preferences, e.g., to perform a defined action such as message filtering, message generation or limiting display screen interruptions. Still further, preferences for handling rules may be derived that consider characteristics of both content and context. Examples of content and/or context based handling rules will be described in greater detail herein.

The preferences 116 may also be organized to include "activation rules" 126 which define a triggering event, after which corresponding handling rules may be evaluated and applied if a corresponding handling rule is satisfied. Thus, certain handling rules 120 may be evaluated regardless of circumstances and other handling rules 120 may first require the occurrence of a predetermined triggering event, e.g., defined by a corresponding activation rule 126 before being evaluated as will be described in greater detail herein. As shown, the activation rules 126 may be organized into activation rules defined by context, such as may be stored in a context data source 128. Also, the activation rules may consist of rules defined by content, which may be stored in a content data source 130. Still further, preferences that define activation rules may be derived that consider characteristics of both content and context. Examples of content and/or context based activation rules 126 will also be described in greater detail herein.

The instant message server software 112 may be implemented in any appropriate manner to implement the features and functions set out more fully herein. For purposes of illustration, and not by way of limitation, the instant message server software 112 is illustrated as having an instant message manager 132 for managing aspects of the instant message system in a conventional manner, such as by maintaining user lists, e.g., in the user database 114, facilitating, logging or otherwise enabling instant message communications, etc. The instant message manager 132 may also interact with other presence and awareness data 118 as may be necessary to provide contact information, availability information and other relevant information as required by the particular implementation of the presence and awareness server 110.

The instant message server software 112 also comprises a context manager 134, which may interact with the processing devices 102 within the instant message community, the instant message clients 108, the handling rules context data source 122, the activation rules context data source 128 and other information that may be relevant that is accessible across the network 104 in order to create and/or evaluate context based handling or activation rules. Similarly, the instant message server software 114 comprises a content manager 136, which may interact with the processing devices 102 within the instant message community, the instant message clients 108, the handling rules content data source 124, the activation rules content data source 130 and other information that may be relevant that is accessible across the network 104 in order to create and/or evaluate content based handling or activation rules as will be described in greater detail herein.

Still further, the instant message server software 112 may comprise an adaptive and/or autonomic behavior manager 138 for providing dynamic autonomic features for instant message enhancement. The autonomic capabilities of the behavior manager may interact with the other components of the instant messaging server software 112 to learn, derive, modify, create, delete or otherwise manipulate preference rules for each instant message system user. In the illustrated configuration, the autonomic capabilities may dynamically adjust the preferences for a given user based characteristics specific to that user or based upon characteristics of classes or groups of users or based upon knowledge learned across the instant message community and/or network 104.

Figure 3:
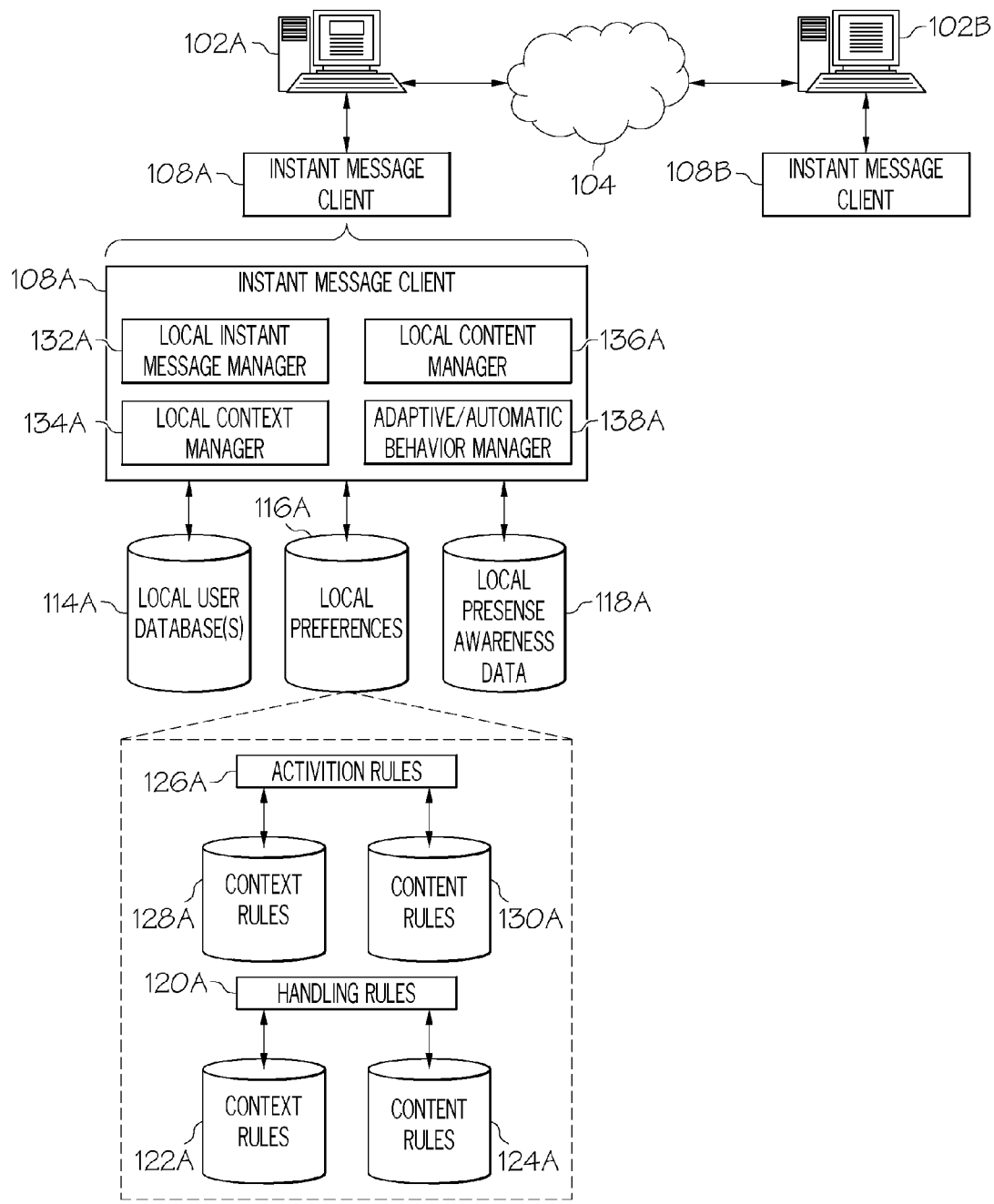
FIG. 3 is a block diagram of a local system that provides enhanced capabilities directed to content and/or context based handling of instant messages in an instant message environment according to various aspects of the present invention.

Referring to FIG. 3, one or more aspects of instant message enhancement may be carried out locally, e.g., on a processing device 102 as an alternative to being performed by server software. In the example of FIG. 3, it is assumed that each instant message client 108 has logged into the presence and awareness server 112 to obtain the contact information for individuals on the user's private list and thus the server 110 is not shown.

A user on a first processing device 102A may communicate using instant messaging via its instant message client 108A, with a correspondent on a second processing device 102B via the corresponding instant message client 108B across a network 104. As illustrated, under this configuration, an instant message client application (instead of or in combination with server software) takes responsibility for managing user preferences, including context and/or content rules that may be utilized to actively, adaptively and/or dynamically enhance the instant messaging environment. In this regard, the components or modules for enhancing instant messaging are similar to that described with reference to FIG. 2, but are applied on a local level.

For instance, the instant message client 108A may comprise a context manager 132A, which may interact with the various aspects of the processing device 102A and optionally with other resources across the network 104, such as other processing devices 102 and/or the presence and awareness server 110 (shown in FIG. 1) for implementing instant messaging. In this regard, the local instant message manager 132A may manage aspects of the local instant message system, such as by controlling pop up instant message windows, maintaining user or buddy lists, e.g., in the user database 114A, initiating contact with correspondents on the user's buddy list, etc. The local instant message manager 132A may also interact with other presence and awareness data 118A as may be necessary to provide contact information or availability information to the presence and awareness server 110, for storing instant message transactions, such as in instant message logs and other relevant information as is conventionally known in the art.

The illustrated instant message client 108A may also include a local context manager 134A and/or a local content manager 136A for implementing preference rules. The context manager 134A may interact with various aspects of the processing device 102A including the context data source 122A associated with the local handling rules 120A, the context data source 128A associated with the local activation rules 126A and optionally with other resources across the network 104, such as other processing devices 102 and/or the presence and awareness server 110 (shown in FIG. 1) in order to create and/or evaluate local context based handling/activation rules 120A, 126A as will be described in greater detail herein.

Similarly, the content manager 136A may interact with various aspects of the processing device 102A including the content data source 124A associated with the local handling rules 120A, the content data source 130A associated with the local activation rules 126A and optionally with other resources across the network 104, such as other processing devices 102 and/or the presence and awareness server 110 (shown in FIG. 1) in order to create and/or evaluate local content based handling/activation rules 120A, 126A as will be described in greater detail herein.

Still further, the instant message client 108A may comprise an adaptive and/or autonomic behavior manager 138A for providing dynamic autonomic features for instant message enhancement, as will be described in greater detail herein. For example, the instant message client 108 can autonomically learn about behaviors, activities, environments, etc. of the user to dynamically create, adjust or otherwise modify the user's preferences.

Still further, the content and/or context based enhancement of instant messaging system may be distributed across a corresponding local processing device 102, the presence and awareness server 110, and/or other processing devices across the network 104 so as to leverage local processing capabilities with knowledge derived across the instant message community.

Figure 4:
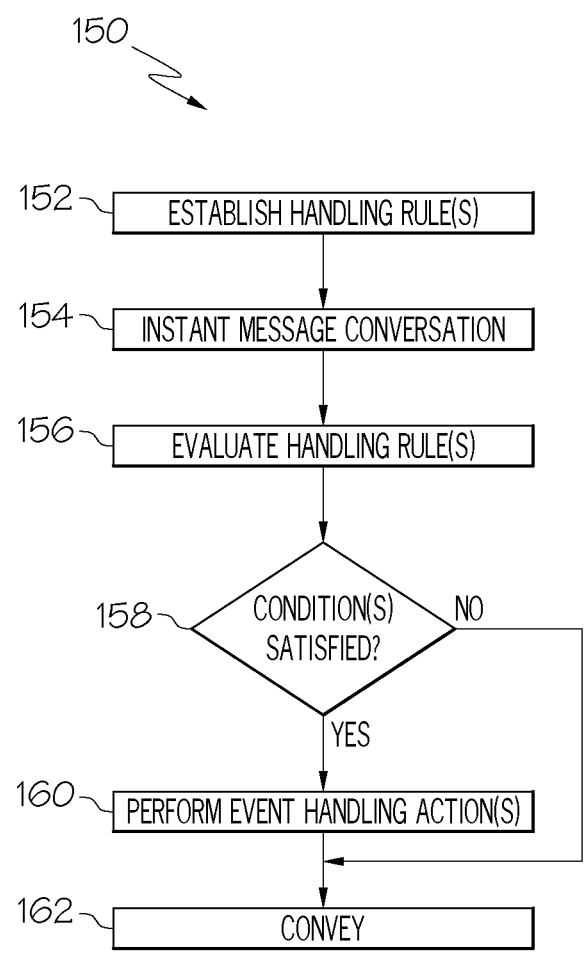
FIG. 4 is a flow chart of a method for implementing content and/or context based handling of instant messages in an instant message environment according to various aspects of the present invention.

Referring to FIG. 4, a method 150 of processing instant message transactions is illustrated. The method 150 comprises establishing at least one handling rule at 152 that is evaluated in an instant messaging environment. Each established handling rule may define a condition based upon an identified content or identified context. Each handling rule may also designate a corresponding event handling action to be performed within the instant message environment if the condition is satisfied. Each handling rule may be created, stored and evaluated locally and/or via a corresponding server such as the presence and awareness server 110, depending upon the specific implementation. For example, the instant message manager 132 or local instant message manager 132A may provide the necessary processing to evaluate information, such as by actively probing for the information or by utilizing agents or other processing devices/techniques to collect, manage, evaluate or otherwise ascertain the information required to test the condition(s) specified in the event handling rules. Conditions may be satisfied by literally meeting the specified conditions, by detecting correlations or other statistical patterns indicative of a condition being satisfied, etc. In certain circumstances, satisfying one or more predicates of a condition may be sufficient to satisfy the event handling rule.

The user engages in an instant messaging communication with a correspondent at 154. During the instant message conversation, event handling rules are evaluated at 156. The exact timing and sequence during the instant message conversation where the event handling rules are evaluated may be dependent upon the nature of the rule. For example, certain rules that define instant message enhancement based upon detected content may be satisfied at different times during the conversation compared to rules that define instant message enhancement based upon detected context. If a condition of an event handling rule is satisfied at 158, then a corresponding event handling action is implemented at 160. For example, as will be described in greater detail below, an appropriate action may be to suppress or otherwise delay a pop up window that would otherwise take focus on the user's processing device when an instant message is received on the user's processing device 102. Still further actions may comprise automatically formatting and transmitting a response message, etc.

If the conditions are not satisfied at 158 or if the event handling action of a satisfied rule has been performed, the result of the instant message transaction is conveyed at 162. In the event that the conditions of the handling rules are not satisfied, the conveyance at 162 may comprise causing a pop up window to appear on a display of the user's processing device to take focus and display an incoming instant message communication. If a handling rule was satisfied at 158 and an event handling action was performed at 160, a conveyance may comprise logging a record of an instant message communication into a transcript log without causing a pop up window to take the active focus from another application operating on the desktop of the user's processing device 102, to provide an icon or other indicia to alert the user that a message has been received, such as by setting a flag or setting an icon in the system tray of the user's application or by otherwise providing visual or audible feedback that the message has been received and logged, etc.

Figure 5:
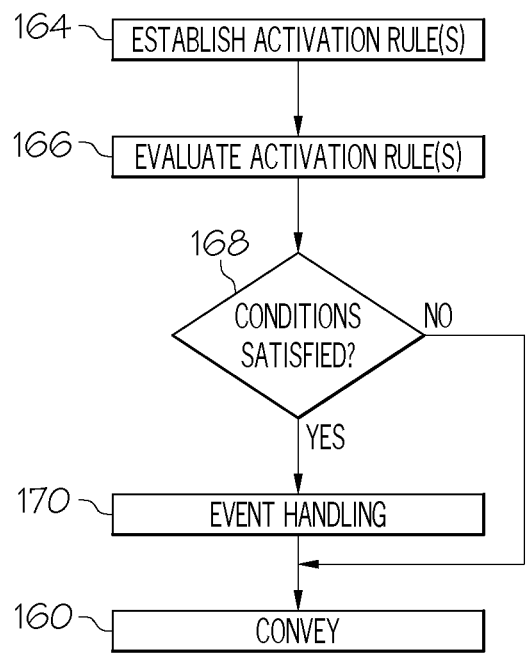
FIG. 5 is a flow chart of a method of applying selective activation of content and/or context based handling of instant messages according to various aspects of the present invention.

Referring to FIG. 5, there are certain circumstances were a user may not want content or context options to trigger for all occasions. Under this arrangement, the user may desire to identify a triggering action that will enable the instant message system to begin evaluating certain event handling rules. For example, the user may define event activation rules at 164. The event activation rules may thus define triggering events that will describe when to begin evaluating corresponding event handling rules established at 152 (FIG. 4). In this regard, activation rules may themselves be defined by content, context, etc. At appropriate times during an instant message communication, the activation rules are evaluated at 166. If an activation rule is satisfied at 168, then event evaluation and handling can be performed as set out more fully herein with reference to FIG. 4.

Figure 6:
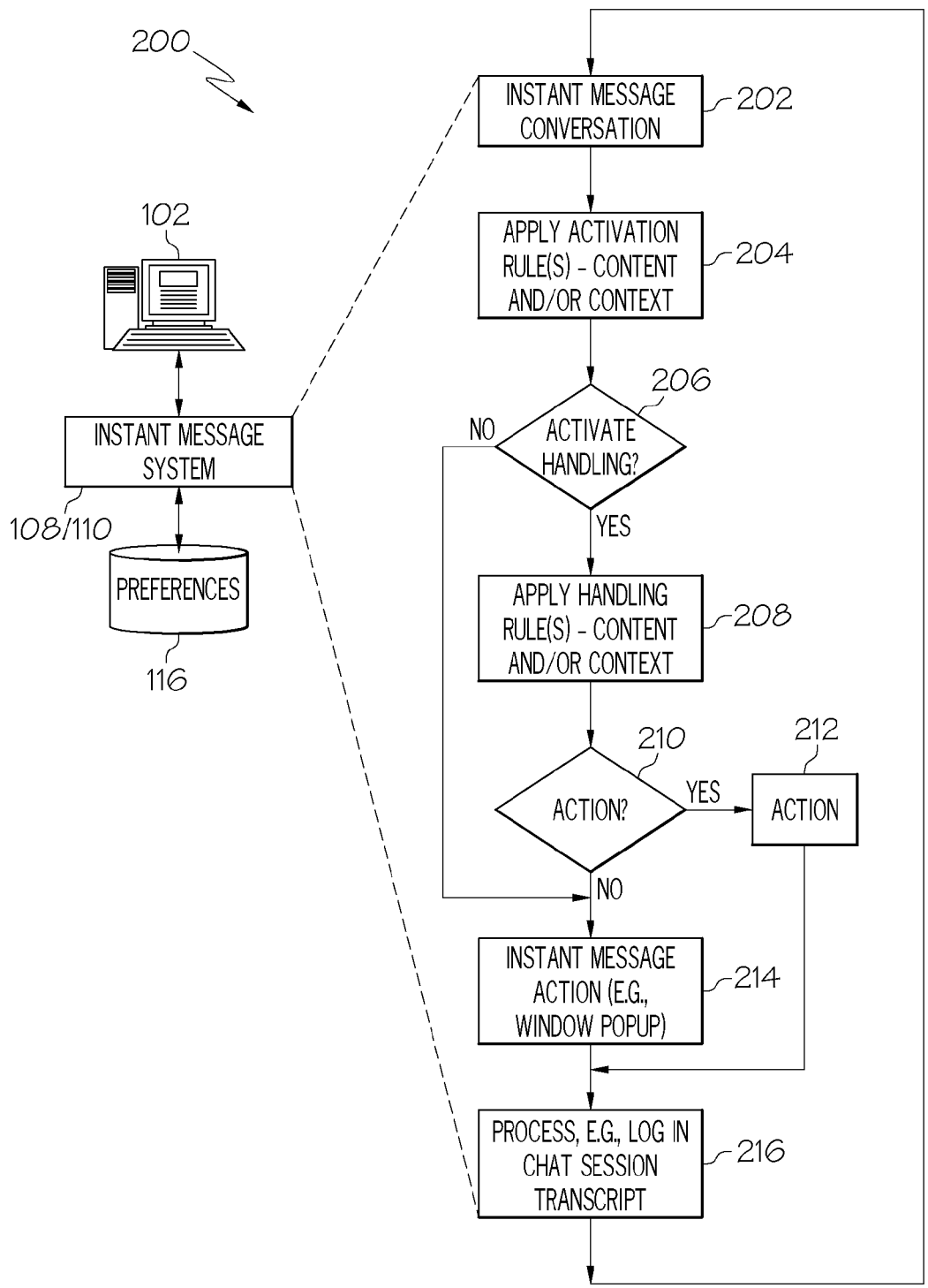
FIG. 6 is a block diagram and flow chart of a computer implementation of instant messaging according to various aspects of the present invention.

Referring to FIG. 6, a method 200 is illustrated for selectively implementing handling rules based upon activation rules. The activation rules and corresponding handling rules have previously been determined and are stored in a preferences database, e.g. preference database 116, preference database 116A, some combination thereof, etc. Moreover, the method 200 may be carried out regardless of whether the preference processing is performed locally at a processing device 102, e.g., by an instant message client 108, or by instant message server software 112 on an instant message application server such as the presence and awareness server 110.

An instant message conversation is carried out at 202. Before or during the conversation, activation rules may be evaluated at 204. If an activation rule is satisfied at 206, then the corresponding handling rules may be evaluated at 208. The timing at which the handling rules are evaluated will depend upon the nature of the rule, examples of which are described more fully herein. If one or more handling rules are satisfied at 210, then a corresponding action is performed at 212. If the activation rules have not been satisfied at 206 and a communication has been received, then the instant message client 108 carries out normal instant message processing at 214, e.g., by triggering a pop up window to display the received instant message, etc. After completing an action at 212 or processing a received instant message at 214, additional processing may be performed if necessary at 216, such as by logging the chat session, etc., and flow loops back to continue the instant message communication.

In many conventional instant message clients, an incoming instant message triggers a pop up window to pop to the front of the display, receive focus, and capture the next set of key strokes. If the user is not careful or prepared for such an event, such as where the user is typing data intended for another application, undesired keystrokes may be captured by the instant message pop up window, which may then be returned to the sender of the instant message or to someone else rather than to the application to which the keystrokes were intended. However, various aspects of the present invention provide enhanced instant messaging which can resolve such conventional occurrences.

Referring to FIGS. 1-6 generally, a preference such as a handling rule or activation rule may include one or more conditions based upon content, such as by defining least one entry in a first list of content expressions. Upon detecting one of the entries in the expressions list, special handling of instant messaging may be performed. As an illustrative example, the abbreviation "ttyl" is typically used in the text of instant message communications to represent the phrase "talk to you later". This message, while courteous, may not be of direct interest to the user as the conversation with the correspondent that sent "ttyl" is essentially over. Thus, an expressions list may be created that includes "ttyl" and/or variants thereof. Moreover, the expressions list may contain any number of other/alternative words, phrases, symbols, indicia, etc. Thus, received (and/or sent) instant message transactions that contain a keyword, phrase, symbol, etc. that is matched to an expression in the user's expression list(s) may be utilized to trigger one or more actions associated with a corresponding handing and/or activation rule.

Keeping with the above example, assume that a handling rule references an expression list associated with the user that includes the expression "ttyl". If the user's instant message client 108 receives an instant message communication that contains the phrase "ttyl", then an exemplary event handling action at 160/170 may be triggered, e.g., to suppress the instant message window popup, such as by implementing a filter or utilizing other processing techniques that prevent an instant message pop up window from becoming the active window of a corresponding display. In addition to suppressing the instant message pop up window, a status flag may be set, e.g., in the system tray of the user's display to designate to the user that the message was received. The message may also automatically be archived in an instant message log.

As a further example of event processing at 160/170, the instant message system may also automatically transmit a reply message to the correspondent. For example, one or more set responses can be programmed so that the instant message client 108 can automatically select/send a conventional closing message without intervention by the user. As an example, upon receiving a message of "ttyl", the instant message client 108 may suppress the instant message pop up window on the user's display and may also automatically respond to the correspondent with an instant message that contains the expression "l8r", a representation of the phrase "talk to you later" or some other message. The message receipt and response may thus be invisible to the user.

Triggering events may also be defined, which are derived from identified content to determine whether event handling of instant message transactions within an instant messaging environment should be applied. Thus, content such as an expression may be used as an activation rule. Moreover, satisfaction of the activation rule may be predicated upon one or more conditions. For example, the user may only want handling rules to be evaluated after the user transmits a particular message to the correspondent. Keeping with the above example, the user may be participating in an instant message conversation with a correspondent. If the user wishes to terminate the conversation, a remark such as "thanks", "bye", or other words or phrases may be used. Such words may be added to a second expression list so that special handling of instant message communications is not performed until one of the activation expressions, e.g., in the second expression list is detected. Thus, the user may have an activation expression list that contains the expressions, "Bye", "Thanks", etc.

Under this arrangement, if the user's instant message transmitted to a correspondent contains an expression that can be matched to an entry in the second expression list, then a triggering event has been satisfied, and the instant message system may begin to evaluate corresponding handling rules. Moreover, a particular activation rule may predicate activation upon not only detecting the predetermined content, e.g., the keyword "Bye", but also other factors, such as time, date, correspondent, etc.

If the above-described activation rule defining an activation expression list is associated with the above-described handling ruled defining a handling expression list, and the user transmits an instant message to a correspondent that contains an activation expression such as "bye", then a subsequent received message that includes a handling expression such as "ttyl" may be handled by logging the message to the instant message transcript and by suppressing the pop up window from taking focus from the user's active application.

When evaluating preferences based upon content, the expressions in the expression list need not completely match. Rather, the evaluation can use tools such as stemming, thesaurus, synonyms, case insensitivity, etc. where desired, to determine whether a suitable match has occurred. Under this arrangement, the condition of the select handling rule may be satisfied where at least one entry in the list of content expressions is matched to content associated with at least one instant message transaction. For example, the instant message manager 132, 132A and/or content manager 134, 134A may evaluate the content of instant message communications, either being transmitted by the user or received by the user to determine whether a content based rule has been satisfied.

Each list of expressions, e.g., words, phrases, symbols and other indicia associated with a content based rule that is either a handling rule or an activation rule may be stored in the content database 116 and may be created by building the list of content expressions from user-selected expressions, expressions derived from a plurality of instant message users, expressions selected from a pick list of expressions, expressions set by an instant message administrator, or otherwise derived.

The list may also be derived from autonomic processes, e.g., as implemented by the adaptive/autonomic manager 138, 138A. For example, at least one entry in an expression list may be built using an autonomic self learning process to dynamically adjust the list of content expressions based upon automated knowledge learned from autonomously monitoring a corresponding user of the instant messaging system or knowledge learned from autonomously monitoring a community of instant message users. Thus, the ability to generate expression lists may be adaptive or otherwise self learning where the self learning rules can be established against an individual, or a plurality of individuals.

As a few illustrative examples, if an autonomic process, e.g., the autonomic manager 138, 138A, detects that the user typically quickly dismisses an IM window when someone say "ttyl" then the system can adaptively provide a rule, e.g., to add the phrase "ttyl" to a handling expression list. The system may further prompt the user to confirm that the is rule is okay to add this association only for one or a select group of correspondents, or whether the autonomously created rule should be applied to all or large groups of correspondents. As another example, an autonomous process e.g., the autonomic manager 138, 138A may detect that a given user quickly closes an instant message pop up window from the instant message system when a message such as "ttyl" is received when the user is working on a pervasive portable processing device such as a palm computer and when working during business hours, but that the user responds to such messages on weekends and in the evenings. The autonomous process can thus build a suitable corresponding rule that is predicated upon a determination of designated time frames, processing devices 102 that the user may be working on, correspondents, and/or combinations thereof, etc.

The activation expression lists are otherwise analogous to the handling expression lists at least in so far as they can be created by the user, by a community of users, from pick lists, network administrators, autonomous processes, etc. According to aspects of the present invention, the activation expression list and/or the handling expression list may be implemented as multiple expression lists. So that different expressions may be associated with different correspondents, groups of correspondents, etc. As an example, multiple expression lists may be created based upon defined functional or social network groups and/or users, such as may be based upon an organizational hierarchy as determined from a directory or other information that may be available to the presence and awareness system.

In addition to, or in lieu of content, handling rules and/or activation rules may be established based upon predetermined context. As noted in greater detail herein, the context may be detected, obtained or otherwise derived, which characterizes conditions that are determined to be relevant to an instant message user such as user behavior, user activity, environment, setting, hierarchical prioritizations and other contextual factors that may be internal or external to a corresponding instant messaging system.

Thus, the handling of instant message transactions may be based upon user activity. As a few illustrative examples, a "writing" (or "typing") context may be inferred by detecting that the user is typing, e.g., by detecting that a predetermined number of keystrokes occurs in a corresponding period of time. While in a writing context, a handling rule may suppress instant message pop up windows. However, once the user leaves the typing context, the system may decide to allow instant message window pop up windows such that the previously received message is displayed. Thus, for example, if the user is in a writing context, a received instant message can be suppressed until there is a break in the typing, e.g., 10 seconds, at which time the received instant message window may pop up and take focus of the active desktop of the user's processing device 102. Alternatively, an instant message received while in the writing context may be logged to an instant message transcript, but the associated pop up window may be suppressed, etc. as described in greater detail herein. A writing context may also be derived by detecting a predetermined application is being used, e.g., that a word processor or email application is open.

The system can determine whether the user is in the "writing context" based upon key strokes and/or the application to which they are targeted. Thus, if the user is typing quickly, e.g., based on some metric, such as 10 or more key strokes per minute into an e-mail application or document processor, or instant messaging system or other application, the system can view the user as being in the context of "writing" and have different rules for when to pop the window to the front.

As another example, the system may conclude that the user is in a "reading" context if the user has loaded information to be read. A corresponding handling rule may thus be created to define a user preference to filter instant message pop up windows if the user is in the reading context. Moreover, the reading context may be further refined with additional rules, conditions, exceptions, etc. For example, the user may prefer to allow instant message pop up windows in a reading context if the user is reading email or html pages, but not if the user is reading financial reports. As yet another example, the user may prefer to allow instant message popup widows if in a reading context if before 9:00 am but not afterwards. Any number of alternative arrangements may also be implemented.

As another example, a "conversation" context may be used to define a context in which the user may prefer not to be interrupted because of a conversation with someone else. Moreover, intelligence may be applied such that the nature of the individual that the user is conversing with is a variable. In this regard, organizational distance, such as may be derived from light weight directory access protocols (LDAP)s may be utilized to decide whether it is okay to interrupt a conversation that the user is having with a third party. For example, the user may be talking with a supervisor. The system can detect this occurrence and set a user preference using a handling rule that will not interrupt the user with communications from individuals with less seniority than the user's supervisor.

Thus, a condition may be predicated upon a hierarchy to decide whether it is okay to be interrupted with instant message transactions. For example, a user may set a preference via a handling rule to always allow instant message pop ups from a supervisor, even if the user is actively having a conversation with a third party. The user may further create an exception to the handling rule, such as where the content of the message from the supervisor is unimportant, such as the message "your welcome". As such, preferences may also be used to set a priority or rule that directs or otherwise establishes a priority for allowing interruptions via instant messages, i.e., enabling the pop up window or conversely, the priority may be to suppress instant message window pop ups.

Hierarchies may also be established to address situations where a content rule and a context rule overlap or otherwise contradict one another. For example, the user may have a handling expression list that includes a command to filter the content of instant messages that contain "ttyl" but may have a context rule that says it is okay to display such messages if the detected context indicates that the user is not busy, is being sent from the user's supervisor, etc.

Context based enhancement of an instant message environment may also be adaptive and may further include the ability to autonomically associate such events with individuals (or a plurality of individuals), such as based on actions that one typically takes when such events occur, as well as how long it takes one to perform those actions As an example, if the user conventionally quickly dismiss an IM window at certain times of the day, when the message is from certain individuals, when actively reading reports, when typing as the instant message is received, etc., then the system can adaptively provide a rule for this as prompt for whether this is associated with an individual or all individuals. The system may also autonomically create rules by observing groups or users across the instant message community. Thus, if most users prefer to not be interrupted by pop up windows during detectable conditions, then corresponding preferences can be created and shared across the instant message community.

Moreover, a "degree of business" may be an adaptive factor that governs a behavior context used to establish rules. If, for example, the user is having a conversation with a first person and the level of interaction is low, such as by considering a calculated number of keystrokes exchanged in a period of time, then interruptions may be acceptable as defined by a configuration set in the user preference handling rules.

When expressing a large thought during an instant message Such side comments have the effect of breaking the flow, both in thought and in transcript. According to aspects of the present invention, a handling rule can identify the context of the user having an instant message window open, and implement an action to suppress the presentation of the correspondent's text until the user has completed typing. Completion can be marked by carriage return, transmitting the instant message or by cessation of keystrokes for a predetermined period of time.

The context based handling rules, examples of which are described above, can also be utilized as activation rules. Thus for example, contexts (writing, reading, busy, etc.) can be defined by sets of activation rules. Once a context is determined, the handling of incoming messages may be determined by handling rules, such as by using the content/context of the message, the content/context/knowledge associated with the sender, the content/context of the environment, etc. as input to how those messages should be handled.

As an example, if the user is not in a busy context, receiving a superfluous message such as "YW" (your welcome) might be fine. When the user is in a busy context, e.g., in the context of "desperately processing e-mail before 6:00 pm", then received instant messages can be suppressed, or at least not cause a pop up interruption such that the messages can be reviewed at a later time.

Figure 7:
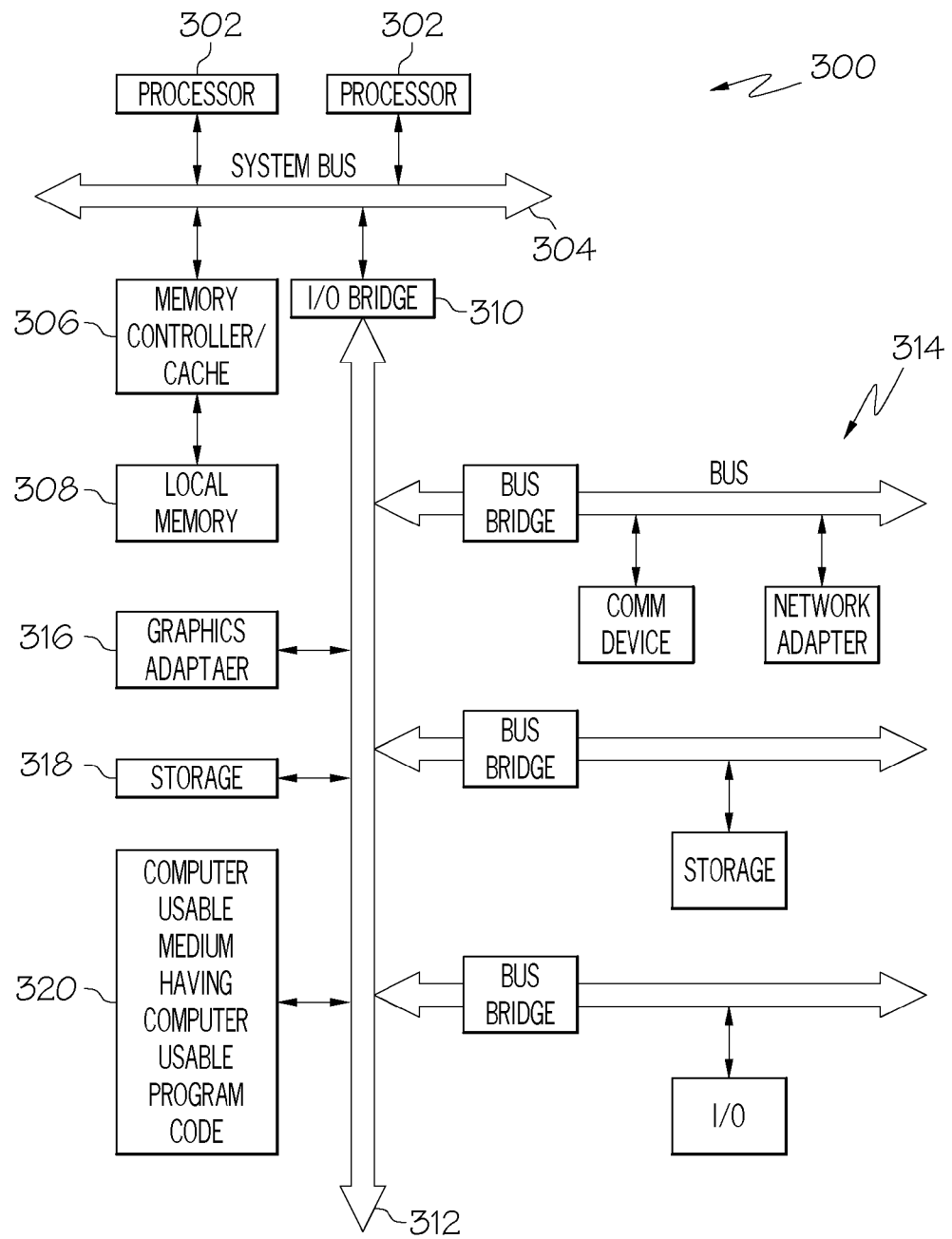
FIG. 7 is a block diagram of an exemplary computer system including a computer usable medium having computer usable program code embodied therewith, where the exemplary computer system is capable of executing a computer program product to provide content and/or context based handling of instant messages in an instant message environment according to various aspects of the present invention.

Referring to FIG. 7, a block diagram of a data processing system is depicted in accordance with the present invention. Data processing system 300, such as one of the processing devices 102 described with reference to FIG. 1, may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bridge 310 is connected to the system bus 304 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318 and a computer usable storage medium 320 having computer usable program code embodied thereon. The computer usable program code may be executed to execute any aspect of the present invention, for example, to implement aspect of any of the methods and/or system components illustrated in FIGS. 1-6. Moreover, the computer usable program code may be utilized to implement the content and/or context based features of instant message enhancement as set out further herein.

The data processing system depicted in FIG. 7 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages.

The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of processing instant message transactions comprising:
    logging a first instant message client into an instant message server;
    obtaining from the instant message server, at least one handling rule that is evaluated in an instant messaging environment in response to receipt of a message, each handling rule defining a condition based upon at least one of identified content or identified context, and a corresponding event handling action to be performed within the instant message environment;
    identifying an instant message conversation within the instant message environment between a user and a correspondent;
    evaluating each handling rule;
    performing the corresponding event handling action of an associated handling rule if it is determined that the condition of that handling rule is satisfied; and
    conveying to the user participating in the instant message conversation, an indication that the corresponding event handling action was performed.

2. The method according to claim 1, wherein at least one handling rule is autonomically generated based upon a dynamic evaluation of at least one of a user or a community of instant message users.

* * * * *